UNITED STATES PATENT OFFICE.

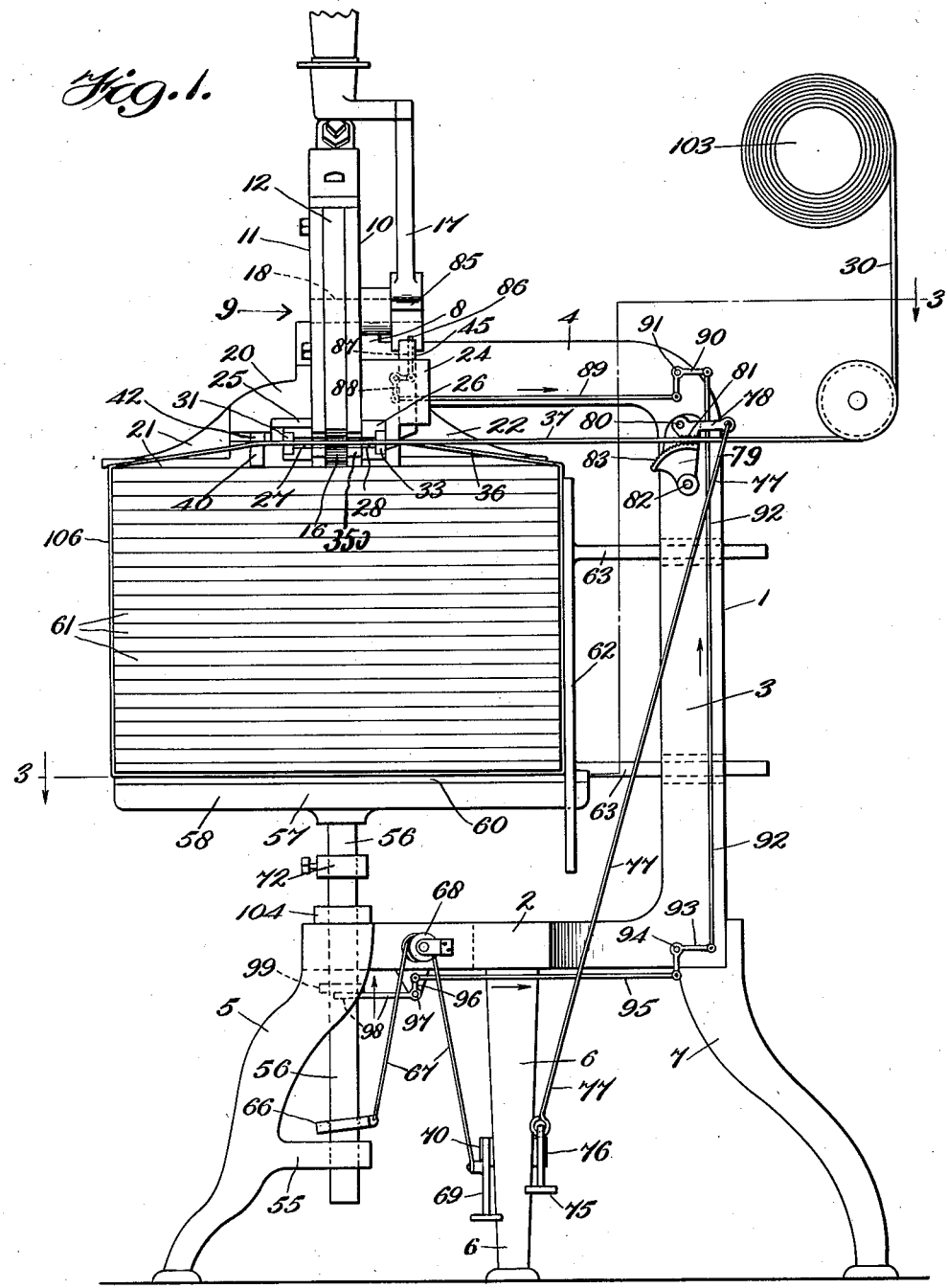

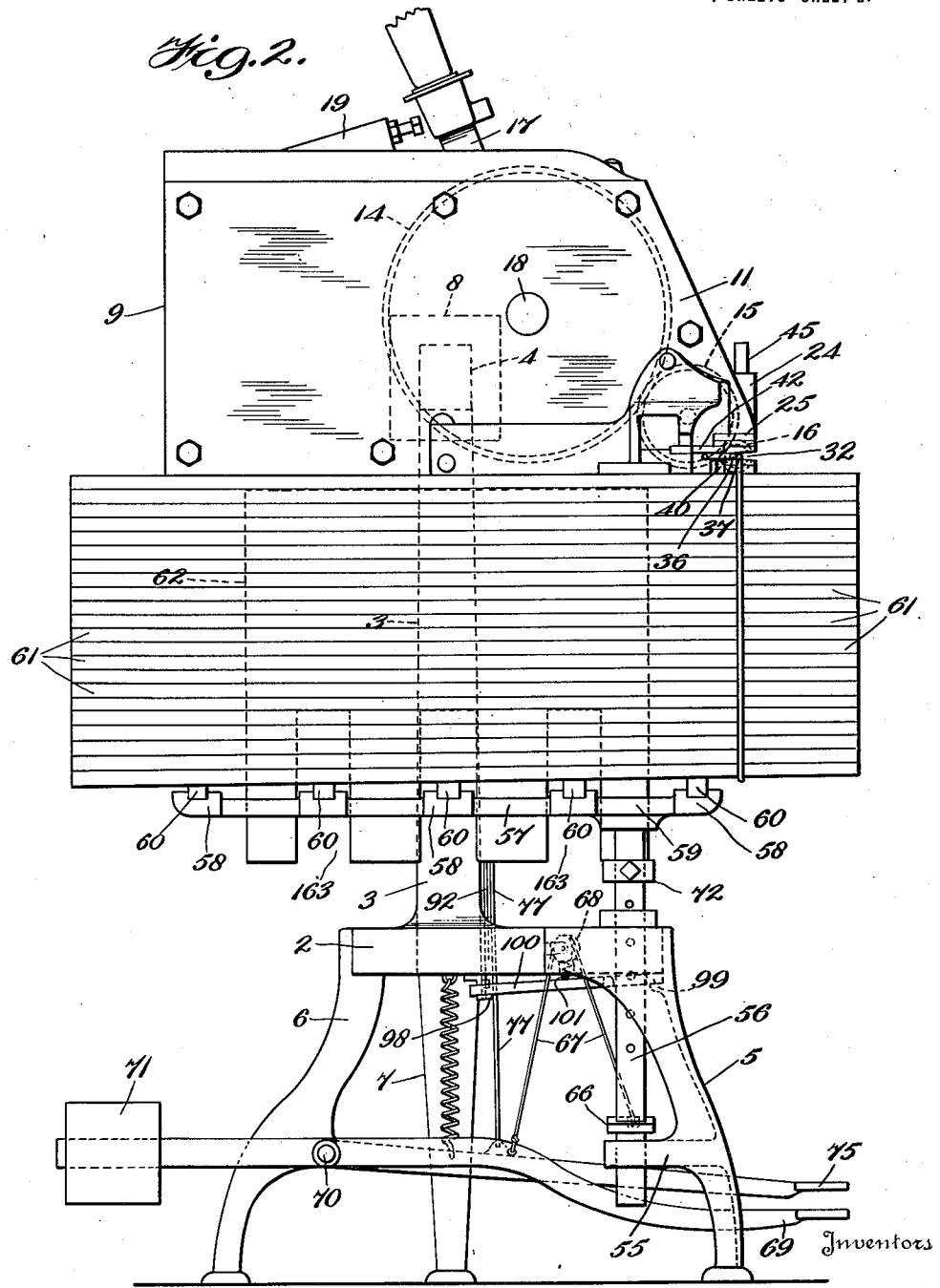

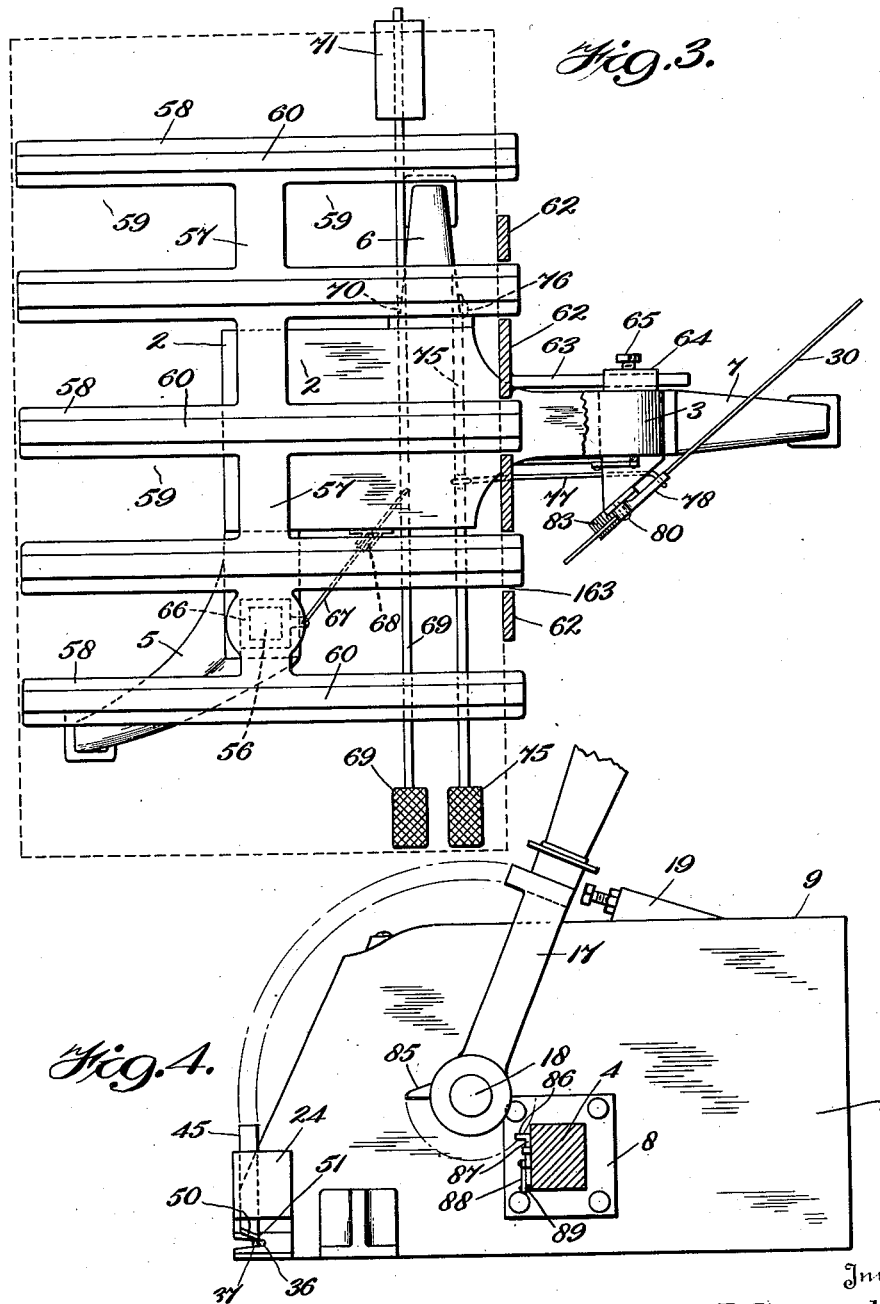

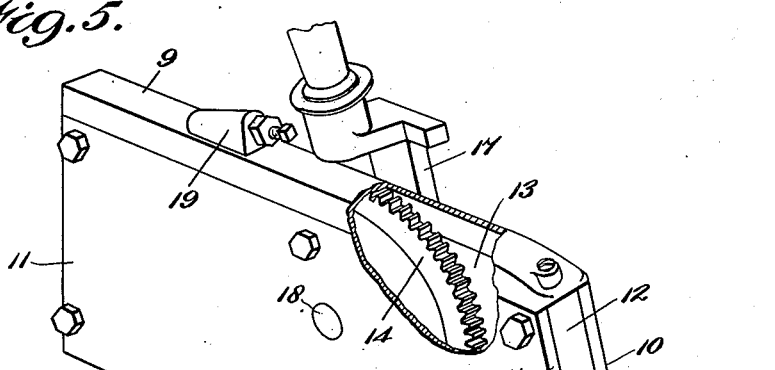
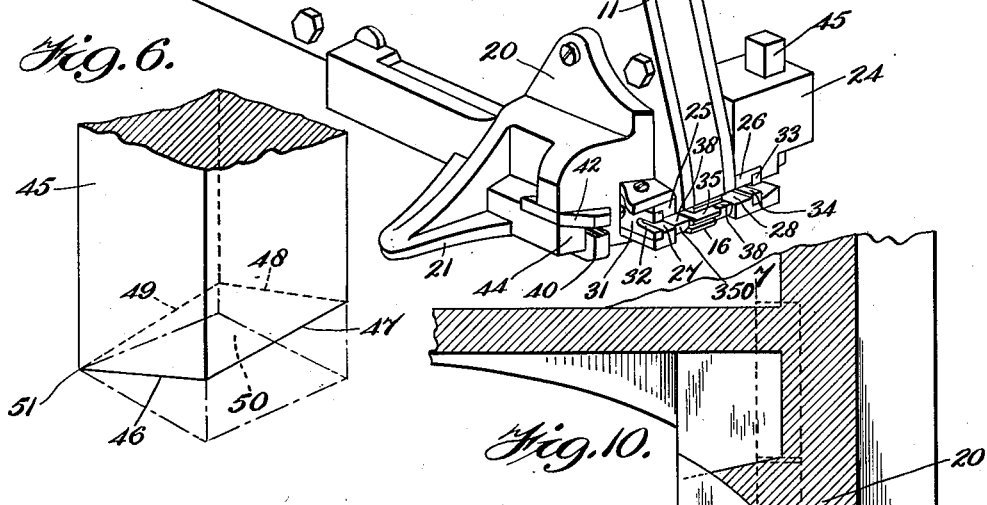
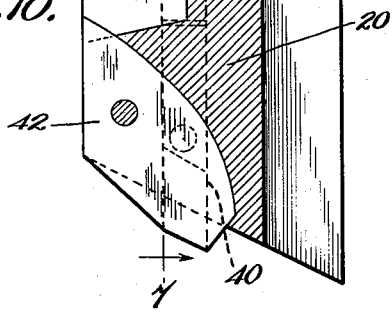
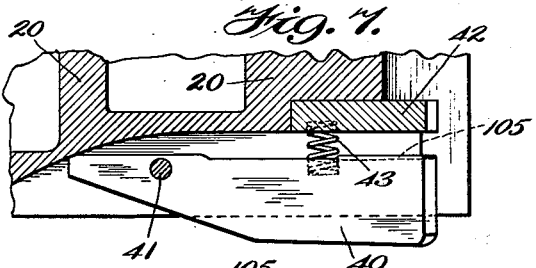
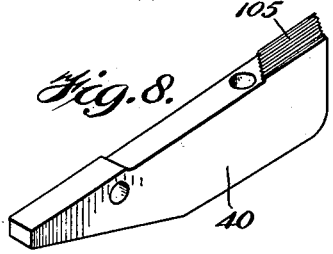
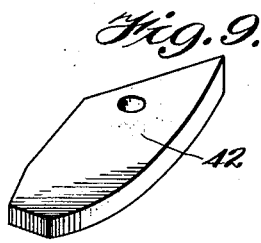

ALEC J. GERRARD AND PARVIN WRIGHT, OF CHICAGO, ILLINOIS.

WIRE-TYING MACHINE.

1,405,110.  Specification of Letters Patent.  Patented Jan. 31, 1922.

Application filed March 27, 1920. Serial No. 369,424.

*To all whom it may concern:*

Be it known that we, ALEC J. GERRARD, a subject of the King of Great Britain, and PARVIN WRIGHT, a citizen of the United States, each residing at Chicago, in the county of Cook and State of Illinois, have invented certain new and useful Improvements in Wire-Tying Machines; and we do hereby declare the following to be a full, clear, and exact description of the invention, such as will enable others skilled in the art to which it appertains to make and use the same.

This invention relates to a wire tying machine, and has for its object to improve that class of machines which are illustrated in U. S. Patent #1300166, dated April 8, 1919, and entitled Bundling machine, issued to Edward Hatch.

It has for its object to provide a machine which will be more efficient in action and less costly to produce than is the machine disclosed in said patent.

With these and other objects in view the invention consists in the novel details of construction and combinations of parts, more fully hereinafter disclosed and particularly pointed out in the claims.

Referring to the accompanying drawings forming a part of this specification, in which like numerals designate like parts in all the views:—

Figure 1 is a front elevational view of a machine made in accordance with this invention;

Figure 2 is a side elevational view of the parts shown in Figure 1;

Figure 3 is a plan view partly in section of a portion of the parts shown in Figure 1;

Figure 4 is a side elevational view of the wire twisting head detached from the machine;

Figure 5 is a perspective view of the parts shown in Figure 4;

Figure 6 is an enlarged perspective view of a portion of the cutting tool;

Figure 7 is a detail sectional view on line 7—7 of Fig. 10 showing the automatic means for gripping the wire;

Figures 8 and 9 are detail perspective views of portions of the wire gripping mechanism; and Figure 10 is a detail sectional view looking down upon the wire gripping mechanism.

The main frame 1 is U-shaped and provided with the lower portion 2, the middle portion 3 and the upper portion 4.

To said portion 2 is secured the legs 5, 6, and 7, as shown, and the upper portion 4 is provided with the flanged plate like member 8 to which is secured the operating head 9 composed of the outer plates 10 and 11 separated by members 12 to provide a space 13 for the operating train of gears 14, 15 and 16. 17 represents an operating lever rigid with the shaft 18, and 19 a spring stop or cushioning means for said lever.

20 represents a bracket rigid with the plate 11 and provided with the foot or extension 21, which is symmetrical with a similar extension 22 on the other side of the head 9. Secured to the plate 10 opposite the bracket 20, is the bracket or lug 24, and housed under said brackets 20 and 24 and secured to the plates 11 and 10 respectively are the members 25 and 26 provided respectively with the slots 27 and 28 which are of sufficient dimensions to permit two bights 36 and 37 of the wire 30 to turn or rotate therein. The member 25 carries the strip 31 having the slot 32 which is only sufficiently wide to receive the bights 36 and 37 of said wire 30, and which holds said bights against rotation. In the same way the member 26 carries the strip 33 similar to the strip 31 which likewise has a slot 34 which receives the same two bights of the wire 30 and prevents them from turning, all as will be clear from Figures 1 and 5. 350 represents the hub of the pinion 16, which is slotted on each side of said pinion as indicated at 38 to permit the bights of the wire to turn therein, while the pinion 16 itself has a slot 35 only wide enough to receive said bights without permitting them to turn.

It results from the construction just disclosed that if the said two bights of wire 36 and 37 are passed through the slots mentioned as indicated in Fig. 2, the slots 32 and 34 will hold said bights from revolving around each other, while the slots 27 and 34 and the slots 38 in the hub of the pinion will permit them to revolve. In the meantime if the pinion 16 is revolved by operating the lever 17, its slot 35 will revolve said bights 36 and 37 around the center of said pinion and said bights will accordingly be twisted together.

40 represents a serrated dog pivoted at 41 to the bracket 20, and controlled by the spring 43. 42 represents an anvil carried by said bracket, and 44 a stop for the end of the wire which is rigid with said bracket 20. 45 represents a vertically movable cutter carried by the member 24, and which is provided with the inclined edges 46, 47, 48 and 49, disposed as best indicated in Fig. 6, to provide the flat inclined surface 50 bounded by said edges, and terminating in the cutting corner, or point 51. The construction is such that should the bights or portions 36 and 37 of the wire 30 be shoved under said surface 50, the cutter will be raised, while the bight 36 will pass and the bight 37 will stop in a position under said point 51, where it will be cut when the operating lever 17 strikes the cutter 45. In the meantime the companion bight 36 will escape severance owing to the inclination of said surface 50, all as will be clear from Figures 4 and 6.

The leg 5, carries the projection 55, through which passes the vertically reciprocating support 56 rectangular in cross section. Mounted on said member 56 is the bottom supporting member 57, having the extensions 58 separated by the slots 59 and carrying the filling strips 60. Resting on the strips 60 are the pieces 61, or other material or package to be bounded with wire, and to one side of said member 57 is the guide plate 62 having the slots 163 into which fit the extensions or projections 58 as shown. Said plate 62 is provided with the projections 63 passing through guides 64 on the frame 3, and may be adjustably secured in different positions by the set screws 65, see Fig. 3.

Passing around the member 56 is the holding collar 66 controlled by the connection 67 passing over the guide, or pulley 68, and controlled by the foot operated lever 69 pivoted to the leg 6 as as 70. Said lever is counterweighted as at 71. 72 indicates an adjustable collar on the member 56, which limits its downward travel. 75 represents a foot operated lever also pivoted to the leg 6 as at 76, see Figs. 1 and 3, and which controls the connection 77, leading to the lever 78 pivoted to the member 3, as at 80, and provided with the serrated jaw portion 81. Said segment is pivoted to the frame as at 82, and is provided with the curved serrated jaw 83. The jaws 81 and 83 both swing around the pivot 82 as a center when the lever 75 is depressed, and thus put a tension on the wire 30, as will appear more fully hereinafter.

As best shown in Fig. 4, the lever 17 is provided with a lug 85, which when said lever is operated contacts with the toe 86 carried by the connection 87 pivoted to the bell crank 88, thus moving the rod 89 in the direction of the arrow, and swinging the bell crank 90 on its pivot 91 to move the rod or connection 92 in the direction indicated by its arrow. The movement of said rod 92 upwardly as shown, will swing the bell crank 93 on its pivot 94, and move the connection 95 in the direction indicated by its accompanying arrow, thereby turning the bell crank 96 on its pivot 97, and moving the extension 98 upwardly as indicated by its arrow, all as will be clear from Figures 1 and 4.

As is best shown in Fig. 2, the supporting member is held in its adjusted positions by the loose collar 99 provided with the extension or arm 100, so that should said arm be lifted against the compression of the spring 101, said collar 99 would release said member 56 and permit it to fall to its normal position.

It will be further noticed that the connection 92 passes down the side of the frame member 3, so that the extreme end of the lever extension 98 passes under the end of said arm 100, and is therefore in position to raise said arm and release said member 56 whenever the operating lug 85 strikes said toe 86.

The operation of this machine will be clear from the foregoing but may be briefly summarized as follows:—

Any suitable supply 103 of wire may be provided from which the wire 30 is drawn, and any desired package 61 may be placed upon the supporting platform 57, 58. When the machine is ready for operation, the stop collar 72 will be in contact with the cushioning means 104, whereupon an end of the wire 30 may be passed between the serrations 105 of the dog 40, and the anvil 42, and the treadle 69 operated, which will raise said package 61 into contact with said dog 40 and grip the end of the wire between said dog and its coacting anvil 42. The bight 36 of the wire is now passed through these slots 32, 27, 38, 35 and 34, as well as around the package 61, as indicated at 106, and back through said slots to form the bight 37 all as will be clear from Figures 1, 2 and 5.

After leaving the slot 34, the last bight 37 of the wire is passed between the serrated jaws 81 and 82, and is pulled moderately tight by hand.

The operation of the lever 69 through the collars 66 serves to lift the package as will be readily understood, whereupon the loose collar 99, under the control of the lever 100 and spring 101 serve to check or to hold the parts in their elevated or adjusted positions.

The filling pieces 60 are preferably made somewhat thicker, or higher immediately under that end of the package which is being wired, than under the opposite end, so that the pressure on the package will be somewhat greater at its wired end than at its other end.

The wire having been adjusted around the package, and automatically gripped, in a manner disclosed, the lever foot 66 is operated which swings the serrated jaws 81 and 83 around the pivot 82 which tensions the said wire or draws it tight around the box 61. After the wire has been thus tensioned and the package compressed to a sufficient degree, the lever 17 is swung forwardly or toward the right, as seen in Figure 2, whereupon the gear 14 turns the gear 15, which turns the pinion 16, which turns the two bights 36 and 37, held in its narrow slot, 35, and thus twists said bights in the larger slots 27, 28 and 38; owing to the fact that said bights are also held from rotation in the narrow slots 32 and 34. By the time this twisting action of the pinion 16 is completed, the lever 17 will have struck the cutter 45, which, as will be clear from Figure 4, cuts the bight 37 only, and thus frees the wire 30, from the box. At the same time that the cutter 45 is thus driven home, the toe 85 of the lever 17 lifts the toe 86 of the connection 87, swings the bell crank 88, and through the connections 89, 92, 95, the bell cranks 90 and 93, and the bell crank 96, lifts the extension or lever 98, which, in turn, lifts the arm or lever 100 and frees the holding collar 99 against the compression of the spring 101. This freeing of the holding collar 99 permits the supporting member 56, and platform 57, together with the wired box, to descend whereupon the dog 40 automatically releases the bight 36 and the box may be so adjusted to put on another wire or it may be detached, to make room for another box.

It will be observed that the main frame 1 which is of U-shape, is made of a heavy casting or forging, it is easily machined, and its legs 5, 6 and 7 are likewise easily machined, and connected to said main frame. Said legs have a sufficient spread to give a solid and firm foundation, so that there is no likelihood of the machine tilting or canting in use.

Further, the extensions 21 and 22 have lower surfaces which are flush with the top of the package to be wired, and said surfaces coincide with the lower flat surface of the head 9, and form a continuation thereof.

The result is that, an even and considerable pressure may be exerted throughout the top of the box, so that the wire 30 does not have to be tensioned to the same extent it would have to be were such compression not present. There is no tendency of the head 9 to cant or turn, during the wire twisting operation, owing to the fact that it is firmly secured to the arm 4 of the main frame 1, as indicated by the flange 8. The lever 17 is readily stopped in its forward motion by the structure of the cutter 45, and it is cushioned in its backward motion by the spring cushioning member 19, so that said lever 17 may be readily and powerfully operated, thus saving time and making for efficiency in the wiring of boxes.

It is obvious that those skilled in the art may vary the details of the construction, as well as the arrangement of parts without departing from the spirit of the invention, and therefore, I do not wish to be limited to the above disclosure except as may be required by the claims.

What I claim is:—

1. In a wire tying machine, the combination of a main frame of a substantially U-shape having a lower horizontally disposed member, and an upper horizontally disposed member; a plurality of supporting legs rigid with said lower horizontally disposed member; a wire twisting head rigid with and supported by said upper member; means for supporting a package to be wired from said legs; means associated with said legs and frame for lifting said package; and means associated with said head and frame for tensioning said wire and twisting its ends together, substantially as described.

2. In a wire tying machine, the combination of a wire twisting means; means to support and lift the package to be wired; and means adapted to be actuated by the moving package to grip one end of the wire to be twisted, substantially as described.

3. In a wire tying machine, the combination of a wire twisting means; means to support and lift the package to be wired; and means comprising a pivoted dog adapted to be actuated by the moving package to grip one end of the wire to be twisted, substantially as described.

4. In a wire tying machine, the combination of a wire twisting means comprising a head provided with a train of gears and a slotted pinion; vertically reciprocating means to support and lift the package to be wired; means to tension the wire; and means adapted to be actuated by the moving package to grip one end of the wire to be twisted, substantially as described.

5. In a wire tying machine, the combination of a wire twisting means; means to lift and compress the package to be wired; means actuated by the moving package to grip the wire during the lifting and compressing operation; means to tension the wire after the compressing operation; and means to sever the wire at the end of the twisting operation, substantially as described.

6. In a wire tying machine, the combination of a wire twisting means comprising a head carrying a slotted pinion, extensions flush with the lower surface of said head and located on both sides thereof; means to lift and compress the package to be wired against said head and extensions; means actuated by the moving package to grip the wire during the lifting and compressing operation; means to tension the wire after the compressing operation; and means to sever the wire at the end of the twisting operation, substantially as described.

7. In a wire tying machine, the combination of a wire twisting means comprising a plurality of wire bight receiving slots and a slotted wire twisting pinion; a cutter having an inclined surface adapted to be lifted by the wire when said bights are placed in said slots; and a lever adapted to operate said wire twisting means and said cutter at a single stroke, substantially as described.

8. In a wire tying machine, the combination of a wire twisting means comprising a plurality of wire bight receiving slots and a slotted wire twisting pinion; a cutter having a single cutting point and an inclined surface adapted to be lifted by the wire when said bights are placed in said slots; and a lever adapted to operate said wire twisting means and said cutter at a single stroke, substantially as described.

9. In a wire tying machine, the combination of a wire twisting head provided with wire twisting means; a support for the package to be wired having means to raise one end of said package higher than the other; means to lift and compress said package between said support and head; and means for tensioning, twisting and severing the wire after it has been passed about said package in its compressed condition, substantially as described.

10. In a wire tying machine, the combination of a wire twisting head provided with wire twisting means; a support for the package to be wired having means comprising strips of different thicknesses to raise one end of said package higher than the other; means comprising a foot lever to lift and compress said package between said support and head; and means comprising a second foot lever and operating lever, a cutter and connections for tensioning, twisting and severing the wire after it has been passed about said package in its compressed condition, substantially as described.

11. In a wire tying machine, the combination of a wire twisting head having a slotted pinion for twisting the wire; a grip adapted to be operated by the package being wired for holding one end of the wire; means for tensioning the wire; a cutter for the wire; an operating lever for actuating said pinion and cutter; and a stop for said lever, substantially as described.

12. In a wire tying machine, the combination of a wire twisting head having a slotted pinion for twisting the wire; a grip for holding one end of the wire; a stop for the end of the wire to be gripped; means for tensioning the wire comprising a foot lever, a pair of wire gripping members having a common pivot and connections for swinging said members around said pivot; a cutter for the wire; an operating lever for actuating said pinion and cutter; and a stop for said lever, substantially as described.

13. In a wire tying machine, the combination of a wire twisting head; a U-shaped frame for supporting said head; a plurality of legs for supporting said frame, one of which legs is provided with a projection; a vertically reciprocating member passing through said projection and leg; and means associated with said legs, frame, and head for compressing a package to be wired, substantially as described.

14. In a wire tying machine, the combination of a wire twisting head; a U-shaped frame for supporting said head; a plurality of legs for supporting said frame, one of which legs is provided with a projection; a vertically reciprocating member passing through said projection and leg; and means comprising a foot lever and connections associated with said legs, frame, and head for compressing a package to be wired and for tensioning a wire after it has been passed about the compressed package, substantially as described.

In testimony whereof we affix our signatures.

ALEC J. GERRARD.
PARVIN WRIGHT.